United States Patent [19]

Griffis

[11] Patent Number: 4,883,512
[45] Date of Patent: Nov. 28, 1989

[54] PORTABLE ISOLATION ENCLOSURE

[76] Inventor: Steven C. Griffis, 2929 Ave. D, Council Bluffs, Iowa 51501

[21] Appl. No.: 313,160

[22] Filed: Feb. 21, 1989

[51] Int. Cl.$^4$ .............................................. B01D 46/06
[52] U.S. Cl. ..................................... 55/356; 55/385.2; 55/467; 52/63; 135/97; 135/101
[58] Field of Search ....................... 55/356, 385.2, 467, 55/472; 52/63; 135/97, 101, 900–902

[56] References Cited

U.S. PATENT DOCUMENTS

| 3,871,847 | 3/1975 | Fish | 55/472 X |
| 3,925,828 | 12/1975 | Kim | 135/902 X |
| 4,604,111 | 8/1986 | Natale | 55/467 X |
| 4,682,448 | 7/1987 | Healey | 52/63 |
| 4,732,592 | 3/1988 | Spengler | 55/356 |
| 4,750,922 | 6/1988 | Griffis | 55/385.2 X |
| 4,765,352 | 8/1988 | Strieter | 52/63 X |
| 4,794,717 | 1/1989 | Horsmann | 135/901 X |

OTHER PUBLICATIONS

Kontrol Kube, Fiberlock Technologies, Inc.

Primary Examiner—Charles Hart
Attorney, Agent, or Firm—Zarley, McKee, Thomte, Voorhees & Sease

[57] ABSTRACT

A portable isolation enclosure includes an open-bottomed enclosure having walls and a top portion constructed from a lightweight structural frame material with a lightweight fabric stretched thereacross to form a sealed enclosure. Windows of a transparent plastic material are mounted in the wall for viewing outside the enclosure. The lightweight materials of the enclosure allow one or more workers to lift the enclosure off of the ground and transport it from one contaminated area to another. An air filtration unit is pneumatically connected to the enclosure to impart a negative pressure within the enclosure, and to remove asbestos particles from air exhausted from the structure. A selectively closable door is provided in one wall which will permit a person to enter or exit the enclosure, and is designed to allow air to enter the enclosure, under the influence of the negative pressure. The enclosure may be moved by the workers into contact with a mobile or permanent decontamination facility, to allow the workers to exit directly into the decontamination facility.

2 Claims, 2 Drawing Sheets

PORTABLE ISOLATION ENCLOSURE

TECHNICAL FIELD

The present invention relates to sealed portable isolation enclosures for use in cleaning contaminated environments, and more specifically to a portable isolation enclosure particularly suited for removal of asbestos or contaminated particles from the ground.

BACKGROUND OF THE INVENTION

In the early 1940's, asbestos was an inexpensive material which was used in virtually every industrial plant across the nation because of its superior capabilities of noise reduction, insulating and fire retardant qualities. Asbestos was used in cement asbestos pipe, plaster, wiring, pipe insulation, sound absorbing tiles, floor tiles and sprayed-on ceiling structural steel and deck pans.

Asbestos has been found to be a health hazard, and asbestos removal or abatement programs are being conducted to remove these health hazards. Many regulations have been adopted and are in place to insure the safety of those workers who are removing the asbestos, as well as to insure that the asbestos being removed will not be introduced into the surrounding atmosphere. For example, U.S. Pat. No. 4,786,296 describes one type of system which is employed in an asbestos removal project.

In most projects, an enclosure is created around the space in which the asbestos is to be removed. The space is sealed by means of plastic sheets or the like with an air inlet provided to permit air to be drawn therein. A filtration unit such as the Model MT-3 of Microtrap, Inc. of Maple Shade, N.J. or the Model ST 2000 of Global Consumer Services, Inc. of Los Angeles, Calif. is employed with each of the units having an air inlet and an air outlet. The air outlet of the filtration unit is placed in communication with the area outside of the enclosed space. A blower means is provided in the filtration unit so that the contaminated air in the enclosed space will be drawn through the filtration unit with the asbestos fibers being collected in the filtration unit. The filtration units are sometimes referred to as negative air systems so that air is drawn through the air inlet formed in the wall and thence through the filtration unit.

In some situations, asbestos-containing articles and materials may be strewn about the ground adjacent a contaminated structure. In such a case, shower rooms or the like are not immediately available at the facility. The present procedure is for the worker to proceed directly to a decontamination facility or a shower. As the worker moves from the contaminated environment to the decontamination facility, it is quite possible that asbestos fibers will fall from the contaminated clothing and be disseminated into the air through which the worker is passing.

Furthermore, in the outdoor environment, the act of collecting contaminated articles from the soil can cause asbestos fibers to be deposited in the air and carried into the atmosphere. Thus, collection of the contaminated articles can cause contamination of the surrounding atmosphere.

It is therefore a principal object of the present invention to provide an enclosure which is transportable with a person in the outdoor environment to enclose the area where contaminated articles are being collected from the ground.

More specifically, it is an object of the invention to provide a transportable enclosure which may be moved by a contaminated person from the contaminated area to a decontamination facility with a minimum of asbestos fibers being released from the contaminated area into the atmosphere.

Still another object of the present invention is to provide a device of the type described which includes a negative air system having a filter means provided thereon to prevent the escape of contaminated material from the interior of the enclosure.

These and other objects will be apparent to those skilled in the art.

SUMMARY OF THE INVENTION

The portable isolation enclosure of the present invention includes an open-bottomed enclosure having walls and a top portion. The walls and top portion are constructed from a lightweight structural frame material having a lightweight fabric stretched thereacross to form a sealed enclosure. The open bottom allows workers within the enclosure to collect contaminated materials, and yet maintain the contaminants within the enclosure. A selectively closable door is provided in one wall which will permit a person to enter or exit the enclosure. Windows of a transparent plastic material are mounted in the wall so as to allow workers therein to see out of the enclosure. The lightweight materials of the enclosure and framework allow one or more workers to lift the enclosure off of the ground and transport it from one contaminated area to another. An air filtration unit is pneumatically connected to the enclosure to impart a negative pressure within the enclosure, and to remove asbestos particles from air exhausted from the structure. The door is designed to allow air to enter the enclosure, under the influence of the negative pressure. The enclosure may be moved by the workers into contact with a mobile decontamination facility, to allow the workers to exit the enclosure directly into the decontamination facility.

DESCRIPTION OF THE PREFERRED EMBODIMENT

Figure 1:
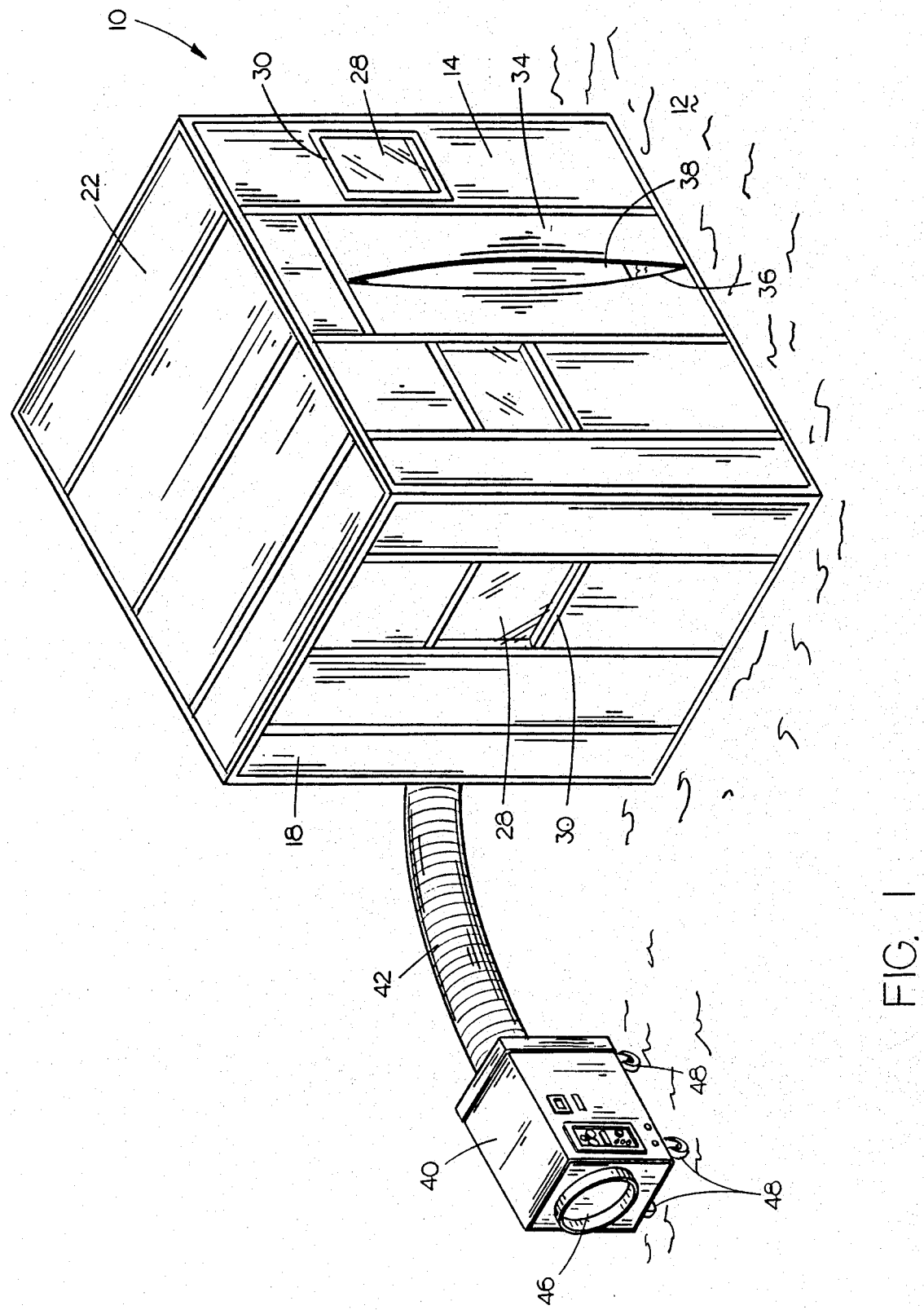
FIG. 1 is a perspective view of the present invention in an outdoor environment.
Figure 2:
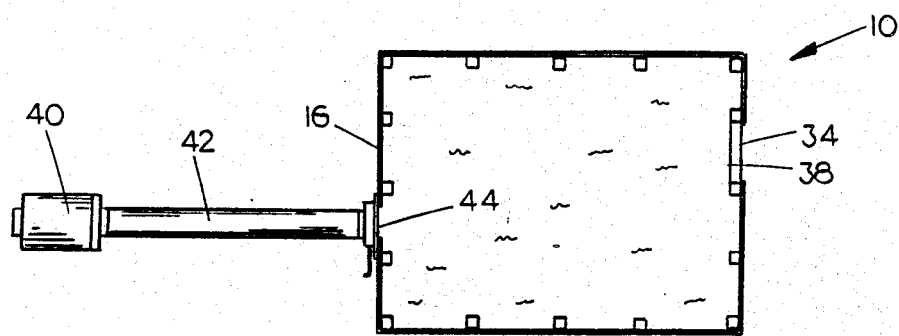
FIG. 2 is a top view of the invention, with the top removed from the enclosure.

Referring now to the drawings, in which identical or corresponding parts are identified by the same reference numeral, and more particularly to FIG. 1, the portable isolation enclosure of the present invention is designated generally at 10 and is designed for use in an outdoor environment on open ground 12. Normally, a worker would merely collect as much of the asbestos-containing material which lies on the ground and place it in a container for disposal. However, the action of collecting the materials from the ground causes asbestos fibers to break free of the material and escape into the surrounding atmosphere. It is to avoid the shortcomings of the conventional method that the apparatus of this invention has been designed.

The isolation enclosure 10 of the present invention includes a front wall 14, rearward wall 16 (not shown in FIG. 1), opposite side walls 18 and 20, and a top 22. The entire enclosure 10 is constructed of lightweight materials, so as to allow a worker to lift and move the enclosure as desired.

Figure 4:
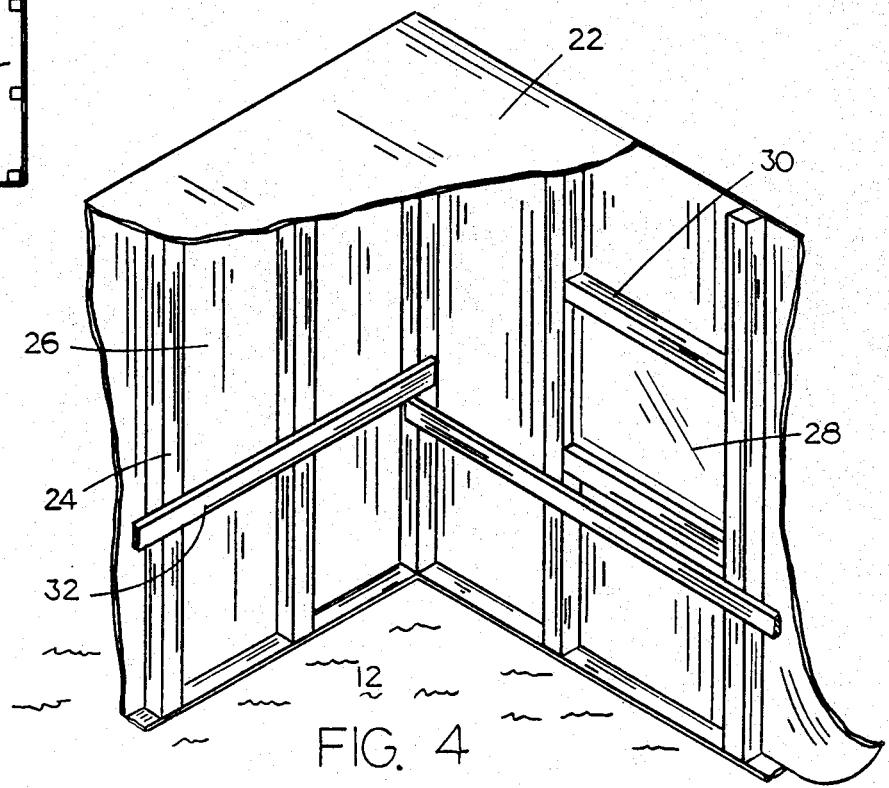
FIG. 4 is a partial interior perspective view of the present invention.

Walls 14, 16, 18 and 20, and top 22, are all constructed of lightweight structural frame members 24 with a lightweight fabric or polyethylene material 26 affixed over the framework to form a sealed enclosure. Preferably, the lightweight fabric material is a plastic sheeting or the like which will prevent the escape of asbestos fibers therethrough. Windows 28 may be formed in the walls 14, 16, 18 and 20 using a transparent plastic material affixed within a frame 30. In this way, the workers inside the enclosure 10 may lift and move the enclosure while viewing through the window 28. Windows 28 will also allow additional light within the enclosure. As shown in FIG. 4, a handrail 32 is affixed to frame members 24 on the interior of enclosure 10, and may be utilized by the workers to lift the frame and move it to the desired location.

Enclosure 10 is provided with a door 34 mounted in forward wall 14, which is formed of a plastic material with a slit 36 cut vertically down the center to allow the material to be separated and a worker to step through. A second fabric sheet 38 is affixed along one edge above the door and hangs downwardly so as to swing inwardly into the enclosure when pushed by a worker. In this fashion, hanging sheet 38 will hang flush against slitted door 34 to prevent escape of asbestos fibers from enclosure 10.

A negative pressure air filtration unit 40 includes a pneumatic hose 42 which extends from the unit 40 to an opening 44 in rearward wall 16 of enclosure 10. Air filtration unit 40 will withdraw air from the interior of enclosure 10, filter the air to remove asbestos fibers, and exhaust the air through outlet 46. Thus, air filtration unit 40 will cause a negative pressure within enclosure 10. The design of door 34, utilizing a hanging sheet 38, will allow air to enter through door 34 into enclosure 10 to replace air being withdrawn by air filtration unit 40. Because a negative pressure always exists within enclosure 10, asbestos fibers disturbed during the collection process will not escape through door 34, but will be drawn through air filtration unit 40 and removed from the air. Simultaneously, fresh air will be drawn through door 34 for the workers within enclosure 10. A set of caster 48, affixed to the bottom of air filtration unit 40, allow the unit 40 to roll over the ground to follow movement of enclosure 10.

Once work has been completed in a specific location, enclosure 10 may be move d by workers therein to a decontamination facility. Since most locations do not provide sufficient facilities for decontamination, the inventor herein has provided a mobile decontamination facility 50 (see FIG. 3) within a mobile trailer 52. Trailer 52 is separated into three distinct areas—namely, a rearward equipment room 54, an intermediate shower room 56, and a forward "olean" room 58.

Figure 3:
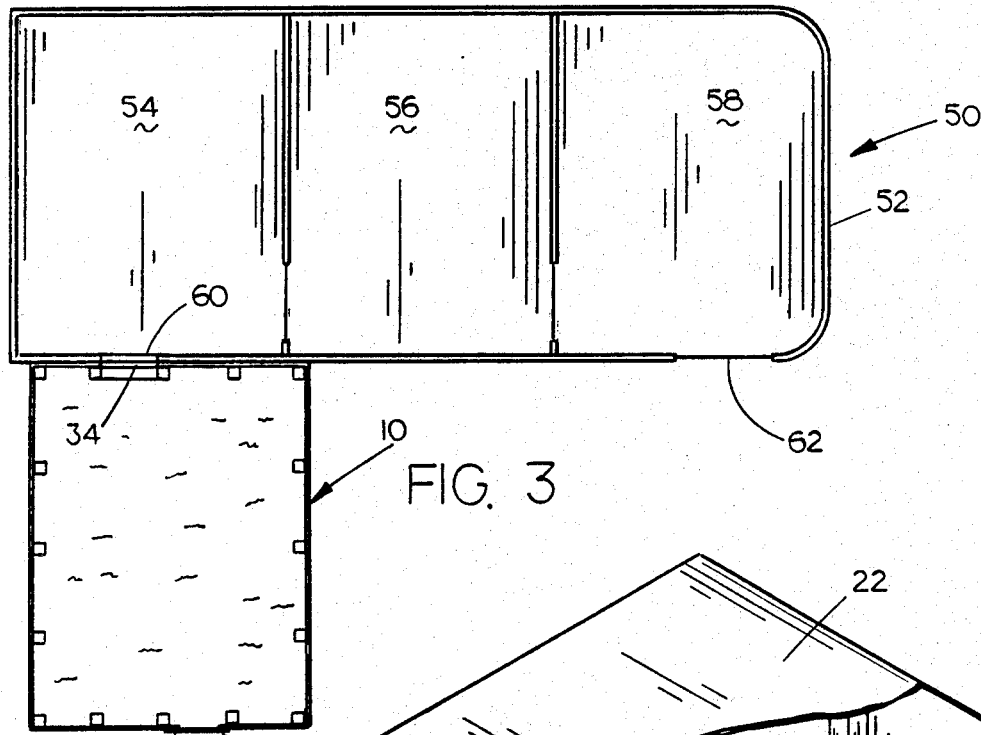
FIG. 3 is a top view of the present invention in sealed contact with a decontamination facility, the roofs being removed so as to view the various areas of the enclosure and facility.

Enclosure 10 is moved adjacent decontamination facility 50 with its door 34 placed in sealed contact with an exterior door 60 in equipment room 54, as shown in FIG. 3. In this fashion, workers can exit directly from enclosure 10 into equipment room 54. Thus, the enclosure 10 permits a worker having contaminated clothing to be moved from the work area to the decontamination facility without the threat of asbestos fibers being disseminated outside of the enclosure.

Once within the equipment room, the workers will remove contaminated clothing and store contaminated equipment, and then pass into shower room 56. The workers then move to clean room 58 where they may exit the facility through an exterior door 62.

Whereas the invention has been shown and described in connection with the preferred embodiments thereof, it will be understood that many modifications, substitutions and additions may be made which are within the intended broad scope of the appended claims. For example, structural framework 24 may be of any lightweight structural material. Likewise, any lightweight fabric material which will prevent the escape of asbestos fibers may be utilized to enclose the framework. Thus, it can be seen that a novel isolation enclosure has been provided which accomplishes at least all of its stated objectives.

What is claimed is:

1. A portable enclosure for collecting contaminated material from the ground, comprising:

an open-bottomed enclosure means having a top portion, a wall means depending from said top portion and extending to the ground, and an interior adapted to accommodate at least one person for collecting contaminated material from the ground within the enclosure means;

said top portion and wall means being sealed to prevent contaminated material from passing therethrough; said wall having at least one selectively closable door means provided therein to permit a person to enter and exit said interior of said enclosure means;

said enclosure means being constructed of lightweight materials such that a person can lift and transport said enclosure along the ground;

air vacuuming means pneumatically connected to said interior through said wall means, to remove air from said enclosure means and to place a negative air pressure in said interior;

said air vacuuming means further including air filtration means for removing contaminated materials from the air;

wheel means mounted on said air vacuuming means such that said air vacuuming means will move in conjunction with the movement of said enclosure means; and said door means being operable to allow wire to enter said enclosure when a negative air pressure is present in said interior, and operable to prevent escape of contaminated material therethrough when a negative air pressure is not present in said interior.

2. The enclosure of claim 1, further comprising handrail means mounted within the interior of said enclosure on said wall means and adapted to permit a person within the interior of said enclosure to lift said enclosure means upward from the ground for transport of the enclosure means.

* * * * *